United States Patent
Ambler et al.

(10) Patent No.: US 6,606,642 B2
(45) Date of Patent: Aug. 12, 2003

(54) SYSTEM, METHOD, AND COMPUTER PROGRAM PRODUCT FOR WORKFLOW PROCESSING USING INTERNET INTEROPERABLE ELECTRONIC MESSAGING WITH MIME MULTIPART CONTENT TYPE

(75) Inventors: Christopher Ambler, Redmond, WA (US); Andrew Wallace, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 10/115,858

(22) Filed: Apr. 3, 2002

(65) Prior Publication Data

US 2002/0111989 A1 Aug. 15, 2002

Related U.S. Application Data

(62) Division of application No. 09/200,878, filed on Nov. 30, 1998, now Pat. No. 6,393,456.

(51) Int. Cl.[7] .............................................. G06F 15/16
(52) U.S. Cl. ...................... 709/200; 709/206; 709/218; 709/249
(58) Field of Search ................................. 709/200, 201, 709/203, 205, 206, 1, 100, 102–107, 219, 218, 223, 226–227, 224; 705/5–9; 707/100–104; 715/500

(56) References Cited

U.S. PATENT DOCUMENTS

| | | | | |
|---|---|---|---|---|
| 5,878,398 A | * | 3/1999 | Tokuda et al. | 705/8 |
| 5,930,512 A | * | 7/1999 | Boden et al. | 395/710 |
| 5,960,404 A | * | 9/1999 | Chaar et al. | 705/8 |
| 5,978,836 A | * | 11/1999 | Ouchi | 709/206 |
| 6,016,478 A | * | 1/2000 | Zhang et al. | 705/9 |
| 6,038,541 A | * | 3/2000 | Tokuda et al. | 705/8 |
| 6,237,020 B1 | * | 5/2001 | Leymann et al. | 709/201 |
| 6,304,886 B1 | * | 10/2001 | Bernardo et al. | 707/530 |
| 6,308,179 B1 | * | 10/2001 | Petersen et al. | 707/102 |

OTHER PUBLICATIONS

Hollingsworth, David; The Workflow Reference Model; Document No. TC00–1003; Issue 1.1; Nov. 29, 1994.
Workflow Management Coalition Terminology & Glossary; pp. 1–55; Document No. WFMC–TC–1011; Issue 2.0; Jun. 1996.
Workflow Standard—Interoperability Abstract Specification; pp. 1–68; Document No. WFMC–TC–1012; Version 1.0; Oct. 20, 1996.
Workflow Standard—Interoperability Internet E–mail MIME Binding; pp. 1–113; Document No. WFMC–C–TC–1018; Version 1.0; Oct. 20, 1996.

* cited by examiner

Primary Examiner—Frantz B. Jean
(74) Attorney, Agent, or Firm—Workman, Nydegger & Seeley

(57) ABSTRACT

A client computer in a communications network with a server computer assembles a record set that has a MIME declaration header with a multipart content type and a content sub-type indicative of a workflow media type. The first client computer also assembles a binary file having therein an encoded workflow specification. The record set is then transmitted with the binary file to the communications network. A second client computer on the communications network receives both the record set and the binary file and begins decoding the workflow specification. The second client computer uses an application program to execute the decoded workflow specification so as to perform all or a portion of the workflow process that is specified therein. The workflow specification is optionally written in eXtensible Mark-up Language (XML).

20 Claims, 5 Drawing Sheets

FContent-type:application/x-wfmc-if4-request
StartSession?DomainID=WFCANADA&%%
SourceNodeID-Staffware@lenny.icl.co.uk&RootPID=730&%%
ProcessID=24&ActivityID=2&Source_Session=123&MessageID=1

Content-type:application/x-wfmc-if4-response
StartSession?Source_Session=123&%%
Target_Session=456&DomainID=WFCANADA&TargetNodeID=FlowMark1@george.ibm.com&%%

Timestamp=1996+February+28+16:30&MessageID=2

Content-type:application/x-wfmc-if4-request
StopSession?DomainID=WFCANADA&%%
SourceNodeID=Staffware@lenny.icl.co.uk&%%
RootPID=730&ProcessID=24&ActivityID=3&%%
Source_Session=123&%%
MessageID=23

Content-type:application/x-wfmc-if4-response
StopSession?ReturnCode=0&Source_Session=123&Target_Session=456&%%
DomainID=WFCANADA&TargetNodeID=FlowMark1@george.ibm.com&%%

Timestamp=1996+March+5+08:43&MessageID=24

Content-type:application/x-wfmc-if4-request
CreateProcessInstance?ProcessDefinitionID=Open_Account&ReturnFlag=True&%%
PartentPID=730&ProcessID=24&ActivityID=2&%%
Timestamp=1996+February+28+16:20&%%
DomainID=WFCANADA&SourceNodeID=Staffware@lenny.icl.co.uk&%%
SourceUserID=NULL&SourceRoleID=NULL&TargetUsedID=NULL&TargetRoleID=NULL&%%
SourceBusinessDefinitionProcessName=NULL&%%
Source_Session=123&Target_Session=321&MessageID=3

FIG. 3A

Content=type:application/x-wfcm-if4-response
CreateProcessInstance?ReturnCode=0&Timestamp=1996+February+28+16:30&%%
ProcessID=32&UserID=NULL&RoleID=NULL&%%
TargetProcessBusinessDefinitionName=NULL&TargeState=open.not-running&%%
DomainID=WFCANADA&TargetNodeID=FlowMark1@george.ibm.com&%%
Source_Session=123&Target_Sesssion=321&MessageID=4

Content-type:application/x-wfmc-if4-request
GetProcessInstanceState?ProcessID=42&%%
DomainID=WFCANADA&SourceNodeID=Staffware@lenny.icl.co.uk&%%
Source_Session=123&Target_Session=321&MessageID=7

Content-type:applciation/x-wfmc-if4-response
GetProcessInstanceState?ProcessID=42&ReturnCode=0&%%
State=open.running&%%
DomainID=WFCANADA&TargetNodeID=FlowMark1@george.ibm.com&%%
Source_Session=123&Target_Session=456&MessageID=8

FIG. 3B

From: Client One (c1@phu.com)
To: Client Two (c2@fu.com)
Subject: Workflow Item 123456-1234-12345678/111111-2222-33333333
MIME-Version: 1.0
Content-type: multipart/workflow; boundary="workflow item" id="123456-1234-12345678"
    trans-id="111111-2222-33333333"

This is a workflow message. If your mailer does not understand this workflow
message, you still may be able to reply correctly, as the workflow ID is in
the subject line. Best of luck to you.
---workflow item
Content-type: multipart/alternative; boundary="workflow message"
    --workflow message
    Content-type: text/plain; charset=us-ascii Please edit this spreadsheet with your expense report for the month of
    September and return it immediately.

--workflow message
    Content-type text/html

<h1>Workflow Item</h1>
    <font size=4 color="blue">
    Please edit this spreadsheet with your <b>expense report</b> for the
    month of <b>September</b> and return it <i>immediately</i>.
    </font>

--workflow message--
--workflow item
Content-type: application/vnd.ms-excel
Content-transfer-encoding: base64 kdhfKFHDjhdkfHKfhjDlhkfjkKISkheh8yeeEySA87gfesge9hgsa9Eh9gf
F8ehflk8ye8lkfihelFHf8yhflHFFhieilOYeknflHlfhlieHLFkehFhellheiht
LKFihlehlALIHfheiHLEIhflhelNvheiuHlie...

--workflow item--

FIG. 4

SYSTEM, METHOD, AND COMPUTER PROGRAM PRODUCT FOR WORKFLOW PROCESSING USING INTERNET INTEROPERABLE ELECTRONIC MESSAGING WITH MIME MULTIPART CONTENT TYPE

RELATED APPLICATIONS

This application is a divisional of application Ser. No. 09/200,878 filed Nov. 30, 1998, now U.S. Pat. No. 6,393, 456 entitled System, Method and Computer Program Product for Workflow Processing Using Internet Interoperable Electronic Program Messaging with Mime Multipart Content Type, which is incorporated herein by reference.

FIELD OF THE INVENTION

This invention relates generally to computerized methods of workflow management, and in particular to systems and methods for transmitting and receiving (transreceiving) workflow management specifications using an electronic messaging system MIME standard that is interoperable with Internet electronic messaging system standards, and where the workflow management specifications are optionally written in XML.

BACKGROUND ART

A great variety of mechanisms have been used in the past to automate the routine aspects of tasks as they occur in military, industrial, and administrative entities such as government, as well as educational institutions. These previous efforts to automate routine tasks included various efforts on the part of a variety of technicians and professionals, including mathematicians, statisticians, computer programmers, and industrial engineers in a process often referred to as workflow management. Early efforts in workflow management date at least as early as World War II, and used such technologies as computer punch card and computer machinery for processing the same. Applications for workflow management, at the onset, include maintaining employee and inventory data. More modern efforts at workflow management include electronic mail systems. As workflow management became more comprehensive and technically oriented, electronic data exchange could provide a system in which business transactions could be undertaken and completed using interconnected data processing equipment. These systems were directed toward achieving a "paperless" office in which documents of a great variety could be initiated, completed, transmitted, and stored in a computer.

Workflow is defined as a series of tasks within an organization or organizations to produce a final outcome. In general, workflow is the way that work moves around an organization. Specifically, the work follows a path, and the path is called "workflow". Technically speaking, workflow is defined as the automation of standard procedures (e.g. records management in personnel operations) by imposing a set of sequential rules on the procedure. Each task, when finished, automatically initiates the next logical step in the process until the entire procedure is completed. In a more technical sense, workflow includes parallel processing of multiple tasks which continue, individually and collectively, until the procedure comprising all the tasks is completed.

A typical example of an automated workflow is seen in FIG. 2, where the workflow executes in a communications network having networked server and client computers. In the depicted system, an individual uses a client computer to connect to a server computer so as to begin a workflow request. The server initiates a workflow application. In the case of document processing, the server computer would return a document to the client computer so that the requestor can fill out the computerized document. Upon completion, the requestor then transmits back to the server the completed document in electronic form. The workflow application executing on the server computer accesses workflow archive files for adding additional information to the computerized document. Upon completion of this phase, the server computer transmits an electronic message to an agent who is authorized to perform the requested function. By way of example, this may be an editorial review of the computerized document that is performed by an editor at a second client computer that is the recipient of the computerized document from the server computer. Once the agent has performed the authorized request, the server computer is updated as to the status of that editorial review within the workflow. Next, the server computer executes the workflow specification to perform the next task in the workflow which may be, in the case of a computerized document, a publisher's review of the edited computerized document. The publisher's review may include review and approval of various items contained in the computerized document.

In its simplest form, workflow management can be considered to be a form of document routing. Document routing is a feature of some document image processing systems which are aimed at controlling the route that a document follows through its various stages of processing. In an insurance office, for example, a system might route incoming mail to the appropriate clerk for data entry. Next, the document image processing system may refer queries or sensitive transactions to a supervisor, as well suspend processing of a document if further information was needed, as well as various and sundry tasks of or relating to the image processing of the document.

Because of the initial emphasis in workflow management upon processing of documents, workflow management has often been considered the mere routing of documents. Contemporary workflow management, however, is more than mere document routing, but also includes the passing of messages and reminders to task performers as well as a monitoring of the status of the same, to the end that a major and comprehensive project can be accomplished with as little personnel as possible by using a workflow management software system.

The science of the management of workflow is contemporarily an electronic management of work processes. These processes include forms processing or project management using computer networks and electronic messaging as the foundation. In the case of forms processing, workflow management system may control the procedure for accepting insurance policies, or college admissions. In the case of a technical assistance center for the public, workflow management may involve the art and science of having the right number of people or acting agents at the right times, in their seats, to answer and accurately forecast the volume of incoming calls at the service level that is desired.

Computer software that is used for process automation can be found in systems which are categorized and disciplined by the combination of policies and procedures. An underlining foundation of workflow software is that the computer code for such software has been designed with a set of rules and processes for the type of activity that a company finds itself in. These rules and procedures are selected, for instance, such that the company realizes a desirable degree of return on the company's investment. As such, the software can be proved for its worthiness to serve a business interest.

Within workflow management, and particularly the software that implements workflow management, the basic unit is known as a workflow loop. The workflow loop connects a customer, such as a person making a request or accepting an offer, and a performer, which is a person making a performance, in a four-phase cycle. The workflow loop moves toward completion as participants make speech acts or the equivalent thereof. For example, the customer says the equivalent of "I request." Second, a performer says "I promise to do the request." Third, the performer performs the act and then replies to the customer "I am done with your request." Fourth, the customer reviews the work that was promised by the performer, and then responds to the performer "I am satisfied." As such, the workflow loop is closed.

Workflow management is a fast evolving technology within management science that is increasingly exploited by businesses in a variety of industries. Its primary characteristic is the automation of processes involving combinations of human and machine-based activities, particularly those involving interaction with information technology applications and tools. Although it's most prevalent use is within the office environment in staff intensive operations such as insurance, banking, legal, and in general administration, etc., it is also applicable to some classes of industrial and manufacturing applications.

Myriad inventors have proposed ideas for workflow management computer software, including the concepts of document preparation and routing, and workflow management as automated within the construct of an electronic messaging system in and among a geographically disbursed group of computer networks and users networked thereby. What has been lacking among these ideas in the ability of the proposed workflow management systems to be compatible in their use of electronic messaging of workflow specifications.

With the increasing use of electronic mail or e-mail messaging on the Internet, compatibility of telecommunication systems becomes increasingly important as different users in different countries using different computers and different software have a need communicate. When e-mail messaging compatibility is achieved, then each user can use his respective e-mail system to enable a computer network to send messages to other users with compatibility so that the recipient user can understand the message. This concept of compatibility is often called software interoperability.

Interoperability is the ability to operate software and exchange information in a network that is made up of several different local area networks. When software has the ability to interoperate, it has the ability to function with multi-vendor computers so as to work together using a common set of protocols. By way of example, with interoperability, PCs, Macs, Suns, DECs, VAXs, IBM mainframes, etc. all work together allowing one host computer to communicate with and take advantage of the resources of another.

A software or hardware module is said to be an "interoperator," when it implements part of an OSI model (Open Systems Interconnection Model) and can work with components implementing the other parts of the model. The OSI is the only internationally accepted framework of standards for communications between different systems made by different vendors. As such, a high value is placed on interoperator hardware or software due to the inherent compatibility in the diverse universe of the Internet. Due to the emphasis upon the goal of compatibility or interoperability, interoperability testing is regularly performed in the information technology industry. Within the information technology industry there are several levels of testing of new products and services towards the end of interoperability.

With an increasing emphasis in military, industrial, and governmental organizations' emphasis upon workflow management, there has also been a need for a coordination of such efforts especially as the main vehicle for implementation of the same has been electronic messaging. Electric messaging today is increasingly found in the Internet. Workflow in Internet applications provide, respectively, the information communication capability of the Internet with strategic business processes automation integration capabilities of computer programs that implement workflow management.

Most software vendors have workflow management products available today which involve workflow management technology and there is a continual introduction of more products into the market. One such product, for example, is the "Flow Mark" brand software produced by IBM. The availability of a wide range of products within the market has allowed individual product vendors to focus on particular functional capabilities, while users have adopted particular products to meet specific application needs. The increased development of such workflow management software products have underscored the need for various vendor's products to be able to work together and cooperate in a coordination of workflow management tools. While the prior efforts of software vendors in workflow management products disclose both simple and elaborate workflow management workflow concepts as implemented by workflow management software (workflow engines), a common problem among each of these references is the inability of the same to interoperate.

With the increasing use of the Internet for workflow management, a need for standardization in workflow management has been realized in an organization known as the Workflow Management Coalition. The Workflow Management Coalition (WfMC) was established in August 1993 as a non-profit international body for the development and promotion of workflow standards. Its membership consists of numerous parties interested or involved in the creation, analysis or deployment of workflow management systems. It has been recognized by the WfMC, and those companies joining the organization, that workflow management products require and need some common characteristics, enabling them potentially to achieve a level of interoperability through the use of common standards of common functions.

The WfMC has been established to identify these common functions and develop appropriate specifications for implementation in workflow products. It is intended that such specifications will enable interoperability between heterogenous workflow products and improved integration of workflow applications with other information technology services such as electronic mail and document management, thereby improving the opportunities for effective use of workflow technology within the information technology market, to the benefit of both vendors and users of such technology.

Toward the end of interoperability, the WfMC had advocated the use of the Internet and the electronic messaging aspects thereof for the purpose of achieving interoperability. Specifically, the WfMC has prescribed a standard for providing the communication of workflow management messages among computer systems running workflow management computer programs. As such, the WfMC has given concrete definitions of messages that flow between two computers executing workflow management programs in order to affect interoperability throughout the WfMC standard.

The WfMC emphasizes that workflow brings a distinctive feature to the Internet and encourages use of workflow management through the Internet. The WfMC, from the on set, settled on the use of Multi-Purpose Internet Mailing Extension (MIME) with e-mail as a means for standardizing the interoperation of computer programs executing workflow management software.

It is the goal of the WfMC that workflow management interchange specifications will offer simple mechanisms for providing the means to operate overall process control and synchronization across heterogeneous workflow computer processing mechanisms over the Internet. The WfMC has provided industry with an abstract specification which defines the functionality required to support interoperability between computers processing workflow management software. It is intended that the WfMC standard for interoperability would provide the basis for experimentation by workflow management software vendors to work toward the adoption on a wide-based scale of such standard. Once implemented, the WfMC standard will control the order that one computer makes a request of another computer in the operation of workflow management software. The requesting computer should (optionally) also be able to receive back status information and the request of the enactment of the process definition. As far as possible, this is to be done in a way that is transparent to and unseen by the user.

The WfMC has enunciated the standard for interoperability in a publication known as Interface4 (IF4) which has been published as an abstract specification. IF4 defines operations to instantiate and control a remote sub-process executed by a first computer making a request upon a second computer that executes a workflow management process. In IF4, the requesting computer can inquire the status of the other computer and receive notifications of process events initiated by the first computer. IF4, according to the WfMC proposed standard, the use of Internet e-mail with the MIME protocol.

Interoperability of workflow management software over the Internet in electronic messaging services is needful in view of rapidly challenging automating process that cross departmental boundaries. The WfMC sees that continuous deployment of workflow applications in large enterprises will be made possible only through the support of interoperability of different computer software vendors and their software packages for workflow management. In turn, there will be promoted through such standardization, extra enterprise networks of business processes linking multiple enterprises inside virtual enterprises. For this reason, WfMC has proceeded in the direction of interoperability via enunciating the IF4 standard. The fundamental focus of IF4 and its goal of interoperability is the transmission of data across the network as well as a focus of process invocation, status control, and synchronization of the tasks that make up the accomplishment of a workflow management project. IF4 supports the management execution of business processes, which is the innovation to which workflow technology is directed, and further is the goal of cooperating processes.

The IF4 standard for interoperability of workflow management software that the WfMC has focused upon gives concrete definition of the messages that flow between computers. In the abstract, these messages are mapped into a simple text interface that uses Internet e-mail as the transport method between the two computers. Specifically, the WfMC uses an e-mail "MIME" header to define interoperability messages to both request a task and respond to a task. MIME is discussed further below. Additionally, the WfMC poses use of the Common Gateway Interface (CGI) style of formatting or encoding requests for tasks and responses to that task in the body of an e-mail message. CGI is discussed further below.

The MIME header standard calls for including material other than ASCII text in e-mail messages. The concept and specification of MIME was developed and adopted by the Internet Engineering Task Force (IETF) as a standard map for including non-text information in an Internet mail, thereby supporting the transmission of mixed-media messages across Transmission Control Protocol Internet Protocol (TCP/IP) networks. The MIME protocol, which is actually an extension of the Simple Mail Transfer Protocol, covers binary, audio, and video data. MIME also is the standard for transmitting foreign language text (e.g., Russian or Chinese) which cannot be represented in plain ASCII code. With MIME, other files, including binary files such as pictures, video, sound, and executable files can also be attached to e-mail messages. Since the initial Internet isn't able to directly handle binary files in e-mail, the file must first be encoded in a variety of encoding schemes. The receiver of the attached binary files (called an attachment) must decode the file with the same scheme that was used to encode the file. Many e-mail software packages do this automatically. For example, when sending files which aren't plain US-ASCII across a network-dial-up, at least on the Internet, there are two options. First, one can attach the files as a binary (i.e., non-ASCII file) or one can encode them into ASCII characters and send the file as part of the e-mail message. The first option is preferable, but one can typically only send binary files from one account to another on the same network or between two networks that have agreed between themselves to a method of transferring files. However, the latter is a rarity, and rarely is satisfactorily functional on the Internet. Therefore, MIME was created, employing a "basic64" encoding scheme, which involves relatively simple encoding and decoding algorithms.

CGI, as proposed by the WfMC, is a style for formatting an e-mail message having an encoded workflow management task request and task response in the body of the e-mail message. CGI is the standard way of interfacing computer programs with Hyper Text Transfer Protocol (HTTP) where World Wide Web service so that a World WideWeb Page can display material computed when needed, rather than just being limited to text and graphics. CGI programs normally output HyperText Markup Language (HTML) text produced by a MIME "Content Type" header.

The body of a message in the MIME protocol contains one or more operation requests/responses with appropriate parameters, encoded using concepts defined by the CGI and the Universal Resource Locator (URL) encoding scheme. The codes for designating various MIME formats are standardized at and published by the IETF via various publications known as Requests for Comments (RFC). These standards for MIME designations specify the content types and content subtypes for MIME and are more particularly designated in the following:

(i) Request For Comments No. 2046 titled "Multipurpose Internet Mail Extensions (MIME) Part Two: Media Types", November, 1996, Standards Track, authored by N. Freed and N. Borenstein, which is incorporated herein by reference (RFC 2046); and (ii) Request For Comments No. 2048 titled "Multipurpose Internet Mail Extensions (MIME) Part Four: Registration Procedures", November, 1996, Standards Track, authored by N. Freed, J. Klensin and J. Postel, which is incorporated herein by reference (RFC 2048).

MIME protocol defines the content type and media types that are used on the Internet. There are various MIME content types. Each content type is used on the Internet to define the content type of media that is transmitted with an e-mail. Various specifications, promulgated by the IETF, specify the content type and content sub-type for MIME. The various content types of MIME are several and expand at the discretion of the IETF. By way of example, MIME content types include text, multipart, message, application, image, audio, and video. A user of the Internet World Wide Web uses these MIME content types to interpret data retrieved from worldwide web servers. Each MIME content type has a plurality of content sub-types that further distinguish the type of data transmitted with e-mail messages.

In the "application" MIME content type, various content sub-types can be registered or unregistered with the World-Wide Web Consortium (W3C) or the Internet Assigned Number Authority (IANA). Various software vendors have registered content sub-types as applications with the W3C. As such, a word processing document produced by a particular software vendor's word processing software, if associated with a content sub-type that is registered with the W3C, will have its own content sub-type for the type application. For example, a MIME header containing the "application/ms-word" would indicate that the e-mail message is transmitting data for a software application and that the application is the Microsoft Word brand software application. New content sub-types under the application content type are registered with the W3C for the benefit of ease of use by an e-mail transmitter and receiver on the Internet.

Examples of a request and respective response thereto within workflow electronic messages with a MIME encoding scheme using IF4 interoperability standard as proposed by the WfMC are seen in FIGS. 3A and 3B. As seen in FIGS. 3A and 3B, the WfMC has selected the "application" MIME content type upon which to standardize the IF4 interoperatibility e-mail MIME standard. Additionally, a language that communicates workflow management commands has also been proposed in IF4. To use the workflow management language proposed by WfMC, a e-mail sets forth the content type "application", the content sub-type "x-WfMC-if4-", and additional text therewith depending on whether there is a response or a request involved. This is followed by the process definition language for workflow management as set forth by the4 IF4 standard of the WfMC.

In the IF4 standard proposed by the WfMC, the MIME header is used for requests as "Content-type: application/x-WfMC-if4-request". IF4 defines the format of the MIME header for response as "Content-type: application/x-WfMC-if4-response". The "application" is the content type, the "x-WfMC-if4-request" and the "x-WfMC-if4-response" are content sub-types. The "/" divides the content type from the content sub-type. The "x-" prefix is for a content sub-type indication that the extension is not considered as a standard content sub-type and may change or be defined otherwise by other users.

The process definition language set forth by the WfMC give the list of rules, which are the actions or lists or steps also known as the road map, plan, template, or schema, for executing a particular workflow management plan. Specifically, the workflow process definition language defines the tasks to be performed and the order thereof. Each task is given an identification code and a stated due date.

The process definition language set forth by the WfMC is argued to be extensible depending on the implementation in various workflow management computer software. A difficulty with the IF4 standard of the WfMC is that there are limitations to its flexibility. One such limitation is that a programmer must strictly use the MIME application content type and workflow management content sub-type with the process definition language set forth by IF4. As such, there is no flexibility outside of the standard. Should the programmer wish diversity not found within the IF4 standard, and should write a workflow management specification that is in a process definition language that is not understood by other computer programs receiving the MIME, then a syntax error, system crash, or other non-functionality diagnostic may appear to the user and cause the ultimate goal of workflow management to fail in the computerized process.

It would be an advantage in the art to develop a workflow management programming language which was transportable by an electronic mail messaging server through the MIME standard that would interoperate with other electronic messaging services without causing syntax errors, system crashes, or otherwise failure of a hardware device or software operation due to the inability to recognize, decode, or otherwise process an electronic message containing a workflow process definition language. This type of interoperability is desirable in that errors will not be caused by incorrect programming statements because rules of the various languages being used by computers receiving electronic messages are complied with.

It would further be desirable to define a MIME header used in conjunction with the transport of an e-mail that is within recognized Internet standards of workflow management processes and that could be processed by all Internet e-mail users cognizant of the Internet standard without causing a failure or system crash. In this way, different systems can communicate at best in intimate detail, and at worst at displaying workflow management tasks without causing a system crash or syntactic error.

BRIEF SUMMARY OF THE INVENTION

The inventors propose transreceiving workflow specifications using electronic messaging with messages having a content type "multipart" in a MIME header and a content sub-type representative of a workflow specification. One benefit of using the MIME "multipart" content type is that there can be an encapsulation of several entities within the entity-body of a single message, which is a feature inherent to the multipart content type. The content sub-type code designating a workflow is important in that it will not have any special meaning for HTTP. The workflow specifications are proposed to be written in eXtensible Mark-up Language (XML), which provide a robust tool for specifying workflows. As such, the MIME multipart content type and workflow content sub-type as proposed by the invention represent an accepted MIME protocol that is interoperable with electronic messaging systems in compliance with W3C and IETF standards. By using Internet community protocols for electronic messaging, the invention provides to a large and diverse group of networked entities engaged in workflow management a worldwide interoperable system.

These and other features of the present invention will become more fully apparent from the following description and obtained by means of the instruments and combinations particularly pointed out in the appended claims, or may be learned by the practice of the invention as set forth hereinafter.

BRIEF DESCRIPTION OF THE DRAWINGS

In order to more fully understand the manner in which the above-recited and other advantages of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention and the presently understood best mode for making and using the same will be described with additional specificity and detail through the use of the accompanying drawings in which:

FIGS. 3A and 3B are examples of MIME messages proposed by the WfMC in accordance with IF4, and particularly demonstrating various requests and respective responses thereto.

FIG. 4 is an example of a MIME message coded in XML with a declaration header having a multipart content type with content sub-type indicative of a workflow media type according to the invention.

DETAILED DESCRIPTION OF THE PREFERRED EMBODIMENTS

The invention is described below by using diagrams to illustrate either the structure or processing of embodiments used to implement the system and method of the present invention. Using the diagrams in this manner to present the invention should not be construed as limiting of its scope. The present invention contemplates both methods and systems for the hierarchical storage of data. The embodiments of the present invention may comprise a special purpose or general purpose computer comprising various computer hardware, as discussed in greater detail below.

Embodiments within the scope of the present invention also include computer readable media having executable instructions or data fields stored thereon. Such computer readable media can be any available media which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions or data fields and which can accessed by a general purpose or special purpose computer. When information is transferred or provided over a network or other communications connection to a computer, the computer properly views the connection as a computer-readable medium. Thus, such a connection is also properly termed a computer-readable medium. Combinations of the above should also be included within the scope of computer readable media. Executable instructions comprise, for example, instructions and data which cause a general purpose computer, special purpose computer, or special purpose processing device to perform a certain function or group of functions.

Figure 1:
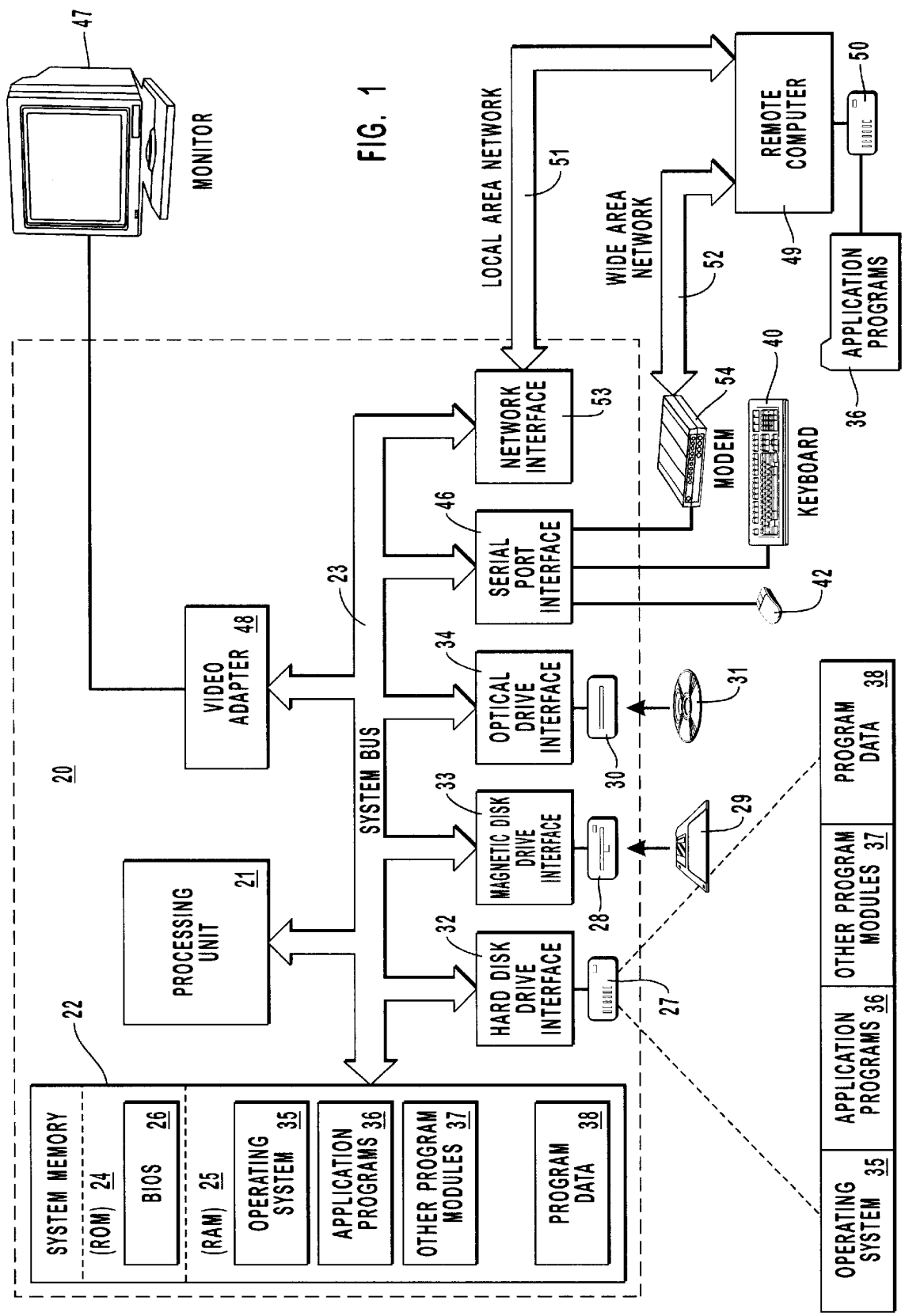
FIG. 1 is an example system that provides a suitable operating environment for the present invention.
Figure 2:
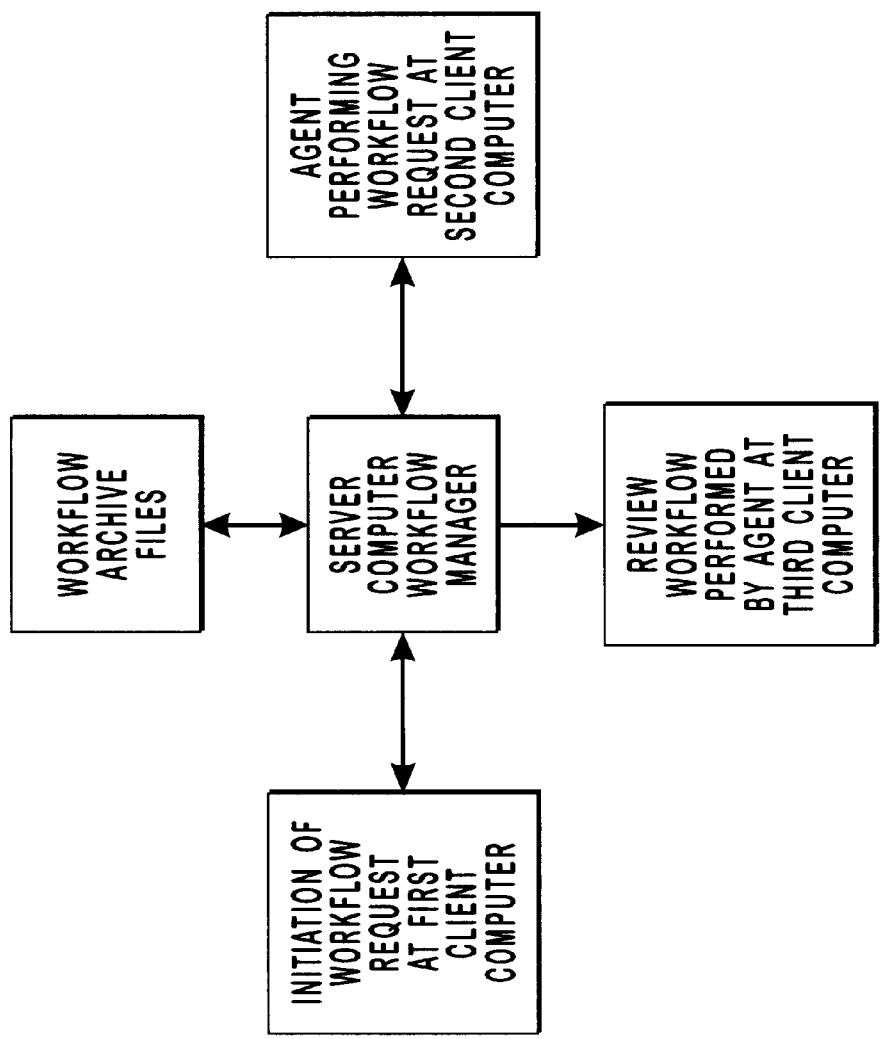
FIG. 2 is a functional block diagram illustrating an example of how an automated workflow executes in a communications network having networked server and client computers.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computer 20, such as during start-up, may be stored in ROM 24. The computer 20 may also include a magnetic hard disk drive 27 for reading from and writing to a magnetic hard disk, not shown, a magnetic disk drive 28 for reading from or writing to a removable magnetic disk 29, and an optical disk drive 30 for reading from or writing to removable optical disk 31 such as a CD-ROM or other optical media. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable media provide nonvolatile storage of computer readable instructions, data structures, program modules and other data for the computer 20. Although the exemplary environment described herein employs a magnetic hard disk 27, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the computer 20 through input devices such as a keyboard 40 and pointing device 42. Other input devices (not shown) may include a microphone, joy stick, game pad, satellite dish, scanner, or the like. These and other input devices are often connected to the processing unit 21 through a serial port interface 46 that is coupled to system bus 23, but may be connected by other interfaces, such as a parallel port, game port or a universal serial bus (USB). A monitor 47 or other type of display device is also connected to system bus 23 via an interface, such as video adapter 48. In addition to the monitor, personal computers typically include other peripheral output devices (not shown), such as speakers and printers.

The computer 20 may operate in a networked environment using logical connections to one or more remote computers, such as a remote computer 49. Remote computer 49 may be another personal computer, a server, a router, a network PC, a peer device or other common network node, and typically includes many or all of the elements described above relative to the computer 20, although only a memory storage device 50 has been illustrated in FIG. 1. The logical connections depicted in FIG. 1 include a local area network (LAN) 51 and a wide area network (WAN) 52 that are presented here by way of example and not limitation. Such networking environments are commonplace in offices enterprise-wide computer networks, intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

As used herein, the term "software component" refers to any set of executable instructions separately cognizable to an operating system that manages a computer system. Examples would include separate processes or threads, application programs, system device drivers, and any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "messaging" refers to sending uniform message blocks between software components in order to communicate therebetween. One example would be the I/O Request Packet (IRP) structure used in the Windows NT brand I/O system to communicate between different drivers.

An advantage of the invention in workflow management concepts is its compatibility with existing content sub-types that are registered for the multipart content type. The multipart content type is intended to mean a media type that is used to insert multiple entities in a single body, or multi-part message bodies. It also indicates that the content type multipart MIME message consists of multiple entities. For the multipart content type, a content sub-type that is neither registered with the W3C nor understood by the recipient will simply be treated as a default content sub-type of the multipart content type. At worse, the recipient will have a message displayed that is part of the e-mail message containing the MIME multipart content type. At best, the recipient will understand the content sub-type of the multipart content type as a workflow specification and will process the request or reply accordingly.

While unregistered content sub-types for the content multipart sub-type do not have any special meaning for Hypertext Transfer Protocol (HTTP), it is desirable that the processing software of the recipient understand the content sub-type of the multipart content type in order to correctly interpret the purpose of each body-part of the accompanying message and to process the body-part according to its intended function. A code that interprets HTTP should follow the same or similar behavior as a MIME computer interpreter does upon receipt of a multipart content type.

All multipart content type MIME messages share a common syntax and must contain a boundary parameter as part of the media-type value. The message body itself is a protocol element. In general, HTTP treats the message-body of a multipart content type MIME message no differently than any other media type, which is a treatment strictly as a payload of the transreceived message, with rare exceptions.

The MIME header field within each body-part of a multipart content type message body does not have any significance to HTTP beyond that defined by the MIME semantics Of the header field. Thus, the inventive protocol of using the "multipart/" gives the benefit of conferring within e-mail messages a recognized and standardized MIME e-mail so that there will neither be a syntactic error nor a system crash when it is received or sent. The only part of the e-mail message that is not standardized upon is the content sub-type under the multipart content type. It is proposed that the content sub-type for the multipart content type is a workflow designated content sub-type. The workflow designated content sub-type will pass without error to and from communications networks and computer user e-mail messaging without causing system crashes or syntax error, even though the workflow designated content sub-type is unrecognized by a recipient user. If an application software module receives an unrecognized multipart content sub-type, the application treats the unrecognized content sub-type as a default content sub-type. The "mixed" content sub-type is the primary and default subtype of multipart, and is used when the body parts of a MIME message are independent and need to be bundled in a particular order.

The "mixed" content sub-type is a registered content sub-type of the multipart content type. As such, pre-existing standards for Internet e-mail MIME encoding enable error free use of the workflow designated content sub-type without requiring registration of the workflow designated content sub-type for the multipart content type with the W3C. The inventive system and method gives process definition to workflow management e-mail messages without forcing a prescription of how to perform the process. As such, the implementation of the process need not be sent in the e-mail message, i.e. by including application specific executable objects.

The inventive method proposes setting forth workflow process definitions or specification that are written in the eXtensible Mark-up Language (XML). XML was developed by the W3C as a pared down version of Standard Generalized Mark-up Language (SGML) which was designed specially for World Wide Web (Web) documents. XML enables designers to create their own customized tags to provide functionality not available with HTML. For example XML supports links that point to multiple documents as opposed to HTML links, which can reference just one destination each.

XML describes a class of data objects called XML documents which are stored on computers, and partially describes the behavior and programs which process these objects. The goal of XML is to enable generic SGML to be served, received, and processed on the Web the way that is now possible with HTML. XML has been designed for ease of use, implementation, and for interoperability with both SGML and HTML.

XML documents are made up of storage units called entities, which contain either ASCII or binary data. Text is made up of characters, some of which form the character definition of the documents, and some of which form mark-up. Mark-up encodes a description of the document storage layout and logical structure. XML provides a mechanism to impose constraints on the storage layout and the logical structure.

A software module called the XML processor is used to read the XML document. The XML processor does work on behalf of an application by reading the XML document and providing information and access as to the content and structure of the document to the application. Unlike HTML, XML programmers can invent their own tags. Unlike SGML, there is no requirement for document definition type (DTD) in XML coding. Also, XML is more powerful in hyperlinking functions than HTML and eliminates some of the complexities of SGML. As such, the coding of workflow specification in XML to be transreceived by e-mail messaging encompasses all of the benefits described above.

FIG. 4 provides an example of a MIME message coded in XML. According to the invention, the MIME has the content type of "multipart" with a corresponding content sub-type of "workflow". In this case, the content sub-type is intended to be indicative of a workflow media type according to the invention. This combination is expressed in the MIME as "multipart/workflow".

One embodiment of the invention includes a system having one or more a processes. These processes include one or more client processes that are intended to be a software component executed on a client computer and also include more server processes that are intended to be executed on a server computer. The server computer is in a communications network with the client computer. In a first client process, the client computer assembles a record set that has a MIME declaration header. The declaration header has a multipart content type and a content sub-type indicative of a workflow media type. The first client process also assembles a binary file that has therein an encoded workflow specification. The record is then transmitted with the binary file to the communications network.

A second client process is performed by a second client computer. The second client computer receives both the record set and the binary file and begins decoding the encoded workflow specification. The second client computer uses an application program to execute the decoded workflow specification. This execution of the workflow specification can be as simple as displaying at least as portion of the decoded workflow specification upon a display device, or it can include one or more executable steps in the workflow specification that the application program executes.

Another embodiment of the invention is an electronic messaging system. The messaging system transmits and receives (transreceives) workflow specifications using a combination of software components and computers for encoding a workflow mail item in the form of an electronic mail item so as to produce a resultant encoded workflow mail item. The messaging system also uses a combination of software components and computers for transmitting the resultant encoded workflow mail item via a inter-server data communication path to a mail server computer by using a data communication protocol which is designed for exchange of electronic mail items in a wide-area network. In this embodiment, the data communication protocol is the eXtensible Mark-up Language (XML), the encoding is executed using the Multipurpose Internet Mail Extensions code (MIME), and the resultant encoded workflow mail item has a MIME declaration header including a multipart content type and a content sub-type indicative of a workflow specification.

The mail server computer can have a software component that decodes the encoded workflow mail item. When so equipped, the messaging system uses a combination of software components and computers for receiving the resultant encoded workflow mail item via the inter-server data communication path at the mail server computer by using a data communication protocol which is designed for exchange of electronic mail items in a wide-area network. The messaging system also uses a combination of software components and computers for decoding the workflow mail item to produce a resultant decoded workflow mail item. In the inventive method of this embodiment, an application program resident on the mail server is used to execute the decoded resultant workflow mail item. The application program can be used to display at least as portion of the decoded workflow specification upon a display device, or it can be used to execute one or more steps of that are specified in the decoded workflow specification.

A still further embodiment of the invention is an inventive method for publishing a workflow hypertext file set on a World Wide Web server machine. In this method, the hypertext file set is packaged as a composite e-mail message on a client computer. To do so, the inventive method embeds hypertext mark-up language commands into the hypertext file set and creates a composite e-mail message containing a binary file having encoded therein a workflow specification, and adds to the composite e-mail message a header containing a MIME declaration with a multipart content type, a content sub-type indicative of a workflow media type, and an identifier identifying the e-mail message as a hypertext file set.

Next, the inventive method transports the composite e-mail message over the Internet from the client computer to the World Wide Web server machine or computer. The World Wide Web server machine unpacks the composite e-mail message to recover the hypertext file set. In so doing, the inventive method identifies the composite e-mail message as containing a hypertext document set by examining the header, and decodes the composite e-mail message into the hypertext file set and a decoded version of the workflow specification. Next, the inventive method processes the hypertext file set with an application program resident on the World Wide Web server machine to execute the workflow specification. The application program is a software component that can initiate and control the display at least a portion of the decoded workflow specification upon a display device. Alternatively, such a software component can initiate and control the execution of one or more executable steps in the decoded workflow specification.

A still further embodiment of the invention is a computerized method for performing workflow on a communications network that includes a plurality of network nodes networked to the communications network, where each node has an associated agent. In this inventive method, a step is performed that issues a workflow request on the communications network. In response to the workflow request, a server computer networked to the communications network builds a workflow specification and a MIME declaration header including a multipart content type and a content sub-type indicative of a workflow specification. The workflow specification includes a set of data containing a set of activities to be completed through the execution of at least one of a plurality of steps of the workflow, where each of these steps is executable by a respective agent. Also included in the workflow specification is status data indicating which steps have been executed in the workflow, and a databank containing one or more references, each reference being an address of an executable program, each executable program being executable on any of the nodes. The server transmits the MIME declaration header and the workflow specification to a selected network node associated with an agent authorized to perform, in accordance with the workflow specification, an appropriate step of the workflow.

In the inventive method of the foregoing embodiment, the agent can be a software program running on a client computer that initiates and controls the display of at least as a portion of the workflow specification upon a display device. Alternatively, the software program can update the status data so as to indicate which steps have been executed in the workflow.

In a further alternative of the foregoing embodiment, the inventive method can function in an environment where the communications network includes a client computer networked to the server computer. In this case, the issuing of a workflow request on the communications network will also include transmitting from the client computer to the communications network the workflow request. Here, the workflow request can include a MIME declaration header including a multipart content type and a content sub-type indicative of a workflow specification.

It is contemplated that each of the foregoing embodiments, and their alternatives, can be embodied in a computer readable medium having computer executable instructions carried thereon in a software component. Such an environment would include one or more client processes for execution on a client computer and one or more server processes for execution on a server computer, where the server computer and the client computer are in a communications network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Patent is:

1. In a system having a plurality of processes including one or more client processes for execution on a client computer and one or more server processes for execution on a server computer that is in a communications network with said client computer, a method at processing a workflow specification using an interoperable communication protocol for electronic messaging systems so as to avoid errors and warnings that otherwise may occur when using an inflexible communication protocol, the method comprising:
   (a) executing first client process including:
      (i) assembling a workflow record set having a MIME declaration header, said declaration header having a multipart content type and a content sub-type indicative of a workflow media type;
      (ii) assembling a binary file having encoded therein a workflow specification;
      (iii) transmitting said workflow record set and said binary file by a communications network;
   (b) executing a second client process including:
      (i) receiving said workflow record set and said binary file;
      (ii) decoding said workflow specification; and
      (iii) using an application program to execute the decoded workflow specification.

2. The system as defined in claim 1, wherein using an application program to execute the decoded workflow specification includes displaying at least a portion of the decoded workflow specification upon a display device.

3. The system as defined in claim 1, wherein the decoded workflow specification includes one or more executable steps, and wherein the application program executes the one or more executable steps.

4. A computer readable medium having computer executable instructions carried thereon for implementing a method of processing a workflow specification using an interoperable communication protocol for electronic messaging systems so as to avoid errors and warnings that otherwise may occur when using an inflexible communication protocol, the method comprising:
   (a) executing a first client process including:
      (i) assembling a workflow record set having a MIME declaration header, said declaration header having a multipart content type and a content sub-type indicative of a workflow media type;
      (ii) assembling a binary file having encoded therein a workflow specification;
      (iii) transiting said workflow record set and said binary file by a communications network;
   (b) executing a second client process including:
      (i) receiving said workflow record set and said binary file;
      (ii) decoding said workflow specification; and
      (iii) using an application program to execute the decoded workflow specification.

5. The computer readable medium as defined in claim 4, wherein using an application program to execute the decoded workflow specification includes displaying at least a portion of the decoded workflow specification upon a display device.

6. The computer readable medium as defined in claim 4, wherein the decoded workflow specification includes one or more executable steps, and wherein the application program executes the one or more executable steps.

7. In a networked system having one or more client systems and one or more server systems, a method of managing a workflow specification using an interoperable communication protocol for electronic messaging systems so as to avoid errors and warnings that otherwise may occur when using an inflexible communication protocol, the method comprising:
   assembling, at a first client system, a workflow record set having a MIME declaration header, said declaration header having a multipart content type and a content sub-type indicative of a workflow media type;
   assembling, at the first client system, a binary file having encoded therein a workflow specification; and
   sending said workflow record set and said binary file to a communications network for subsequent processing by a second client system.

8. A method as recited in claim 7, wherein the workflow record set and the binary file at the first client system represent a workflow request.

9. A method as recited in claim 7, wherein the workflow record set and the binary file at the first client system represent a workflow response.

10. A method as recited in claim 7, further comprising:

receiving said workflow record set and said binary file at a second client system;

decoding said workflow specification at the second client system; and using an application program at the second client system to execute the decoded workflow specification.

11. A method as recited in claim 10, wherein the workflow record set and the binary file at the second client system represent a workflow request.

12. A method as recited in claim 10, wherein the workflow record set and the binary file at the second client system represent a workflow response.

13. A method as recited in claim 10, wherein using an application program at the second client system to execute the decoded workflow specification includes displaying at least a portion of the decoded workflow specification on a display device.

14. A method as recited in claim 10, wherein the decoded workflow specification includes one or more executable steps, and wherein the application program executes the one or more executable steps.

15. A method as recited in claim 10, wherein the first and second client system are the same client system.

16. A method as recited in claim 10, wherein the first and second client system are the same client system.

17. For a networked system having one or more client systems and one or more server systems, a computer program product comprising one or more computer readable media for implementing a method of managing a workflow specification using an interoperable communication protocol for electronic messaging systems so as to avoid errors and warnings that otherwise may occur when using an inflexible communication protocol, the method comprising:

assembling, at a first client system, a workflow record set having a MIME declaration header, said declaration header having a multipart content type and a content sub-type indicative of a workflow media type;

assembling, at the first client system, a binary file having encoded therein a workflow specification; and sending said workflow record set and said binary file to a communications network for subsequent processing by a second client system.

18. A computer program product as recited in claim 17, wherein the workflow record set and the binary file at the first client system represent at least one of a workflow request and a workflow response.

19. A computer program product as recited in claim 18, the method further comprising:

receiving said workflow record set and said binary file at a second client system;

decoding said workflow specification at the second client system; and using an application program at the second client system to execute the decoded workflow specification and to display at least a portion of the decoded workflow specification of a display device.

20. A computer program product as recited in claim 19, wherein the decoded workflow specification includes one or more executable steps, and wherein the application program executes the one or more executable steps.

* * * * *

UNITED STATES PATENT AND TRADEMARK OFFICE
CERTIFICATE OF CORRECTION

PATENT NO. : 6,606,642 B2
DATED : August 12, 2003
INVENTOR(S) : Christopher Ambler and Andrew Wallace It is certified that error appears in the above-identified patent and that said Letters Patent is hereby corrected as shown below:

Column 2,
Line 34, after "as well" please insert -- as --

Column 5,
Line 48, after "automating" please delete "process" and insert -- processes --

Column 7,
Line 52, after "forth by" please delete "the4" and insert -- the --
Line 65, before "the list of rules" please delete "give" and insert -- gives --

Column 9,
Line 53, after "and which can" please insert -- be --

Column 12,
Line 25, after "semantics" please delete "Of" and insert -- of --

Column 13,
Line 57, after "displaying at least" please delete "as" and insert -- a --

Column 14,
Line 28, after "display at least" please delete "as" and insert -- a --
Line 30, after "more steps" please delete "of"

Column 15,
Line 22, after "at least" please delete "as"

Column 16,
Line 35, after "(iii)" please delete "transiting" and insert -- transmitting --

UNITED STATES PATENT AND TRADEMARK OFFICE
CERTIFICATE OF CORRECTION

PATENT NO.    : 6,606,642 B2
DATED         : August 12, 2003
INVENTOR(S)   : Christopher Ambler and Andrew Wallace It is certified that error appears in the above-identified patent and that said Letters Patent is hereby corrected as shown below:

Column 17,
Line 9, before "second client system;" please delete "a" and insert -- the --

Signed and Sealed this

Thirtieth Day of March, 2004

JON W. DUDAS
*Acting Director of the United States Patent and Trademark Office*